(12) United States Patent
Nadalin et al.

(10) Patent No.: US 7,444,509 B2
(45) Date of Patent: Oct. 28, 2008

(54) METHOD AND SYSTEM FOR CERTIFICATION PATH PROCESSING

(75) Inventors: Anthony Joseph Nadalin, Austin, TX (US); Bruce Arland Rich, Cedar Park, TX (US); Xiaoyan Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 10/855,728

(22) Filed: May 27, 2004

(65) Prior Publication Data

US 2005/0278534 A1 Dec. 15, 2005

(51) Int. Cl.
*H04L 9/00* (2006.01)

(52) U.S. Cl. .............. 713/156; 713/157; 713/158; 713/168; 713/175

(58) Field of Classification Search .............. None
See application file for complete search history.

(56) References Cited

U.S. PATENT DOCUMENTS 7,047,404 B1 * 5/2006 Doonan et al. .............. 713/156
2002/0029200 A1 * 3/2002 Dulin et al. .................... 705/67
2002/0112155 A1 * 8/2002 Martherus et al. ........... 713/155
2002/0116642 A1 * 8/2002 Joshi et al. ................... 713/201
2004/0255037 A1 * 12/2004 Corvari et al. .............. 709/229
2006/0179008 A1 * 8/2006 Tallent et al. ................. 705/75
2007/0073621 A1 * 3/2007 Dulin et al. ................... 705/50

* cited by examiner

*Primary Examiner*—Nasser Moazzami
*Assistant Examiner*—Fatoumata Traore
(74) *Attorney, Agent, or Firm*—Hamilton & Terrile, LLP; Stephen A. Terrile (57) ABSTRACT

A method, an apparatus, a system, and a computer program product are presented for validating certificates. A certificate validation service receives a certificate validation request for a target certificate from a client, thereby allowing the client to offload certificate validation tasks into an online certificate validation service that is accessible and sharable by multiple components within a data processing system. In response to a determination that the target certificate is valid or invalid, the certificate validation service sends a certificate validation response with an indicating status value that the target certificate is valid or invalid. The certificate validation service is able to cache information about previously validated certificates and the associated certificate chains, thereby enhancing the efficiency of the service. Different certificate validation policies may be applied against target certificates based upon information associated with the target certificates.

1 Claim, 5 Drawing Sheets

METHOD AND SYSTEM FOR CERTIFICATION PATH PROCESSING

BACKGROUND OF THE INVENTION

1. Field of the Invention

The present invention relates to an improved data processing system and, in particular, to a method and apparatus for multicomputer data transferring. Still more particularly, the present invention provides a method and apparatus for multicomputer communication using cryptography.

2. Description of Related Art

Web-based and Internet-based applications have become so commonplace that when one learns of a new product or service, one assumes that information about the product or service can be found on the World Wide Web and that, if appropriate, the product or service will incorporate Internet functionality into the product or service. Many corporations have employed proprietary data services for many years, but it is now commonplace for individuals and small enterprises to have access to digital communication services that operate through the Internet, which has caused the amount of electronic communication on the Internet to grow rapidly.

One of the factors influencing the growth of the Internet is the adherence to open standards for much of the Internet infrastructure. Individuals, public institutions, and commercial enterprises alike are able to introduce new content, products, and services that are quickly integrated into the digital infrastructure of the Internet because of their ability to exploit common knowledge of open standards.

Concerns about integrity and privacy of electronic communication have also grown with adoption of Internet-based services. Various encryption and authentication technologies have been developed to protect electronic communication. For example, an open standard promulgated for protecting electronic communication is the X.509 standard for digital certificates.

An X.509 digital certificate is an International Telecommunications Union (ITU) standard that has been adopted by the Internet Engineering Task Force (IETF) body. It cryptographically binds the certificate holder, presumably identified by the subject name within the certificate, with the certificate holder's public cryptographic key. This cryptographic binding is based on the involvement of a trusted entity in the Public Key Infrastructure (PKI) called a "certificate authority". As a result, a strong and trusted association between the certificate holder and its public key can become public information yet remain tamper-proof and reliable. An important aspect of this reliability is a digital signature that the certificate authority stamps on a certificate before it is released for use. Subsequently, whenever the certificate is presented to a system for use of a service, its signature is verified before the subject holder is authenticated. After the authentication process is successfully completed, the certificate holder may be provided access to certain information, services, or controlled resources, i.e. the certificate holder may be authorized to access certain systems.

Although PKI technology provides robust standards for secure communication, PKI technology has been adopted slowly. One reason for the slow deployment of PKI is the complexity of PKI management. A typical PKI-compliant application needs to perform a series of tasks in order to satisfy the requirements of the PKI standards, thereby requiring a software developer to learn the extensive requirements of the PKI standards.

For example, a PKI-based data communication session would require a remote party to present a digital certificate to a receiving party. In order for the receiving party to accept the digital certificate to authenticate the remote party's identity, the certificate authority that has signed the remote party's certificate must be trusted by the receiving party. However, the receiving party may not know the certificate's signer, and the receiving party would need to construct a path of trusted relationships, i.e. a trust path, that links an entity that is trusted by the receiving party, e.g., its own certificate authority, to the remote party's certificate. This trust path is also called a certification path, and the set of certificates that are linked in this manner is often referred to as a certificate chain, which includes the remote party's certificate and one or more intermediate certificates. Validation of a certificate chain requires signature verifications and certificate revocation status checks for each of the certificates within a certificate chain, which is a time-consuming task that increases as the certificate chain grows longer.

In order to interact with many other Internet-related applications, most client applications now need the capability of building and validating certification paths in order to set up a PKI-compliant communication session. Therefore, it would be advantageous to have a method and system for performing PKI-compliant certificate path processing activities that minimizes the need of a software developer to be familiar with the PKI standards that are involved.

SUMMARY OF THE INVENTION

A method, an apparatus, a system, and a computer program product are presented for validating certificates. A certificate validation service receives a certificate validation request for a target certificate from a client, thereby allowing the client to offload certificate validation tasks into an online certificate validation service that is accessible and sharable by multiple components within a data processing system. In response to a determination that the target certificate is valid or invalid, the certificate validation service sends a certificate validation response with an indicating status value that the target certificate is valid or invalid. The certificate validation service is able to cache information about previously validated certificates and the associated certificate chains, thereby enhancing the efficiency of the service. Different certificate validation policies may be applied against target certificates based upon information associated with the target certificates.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
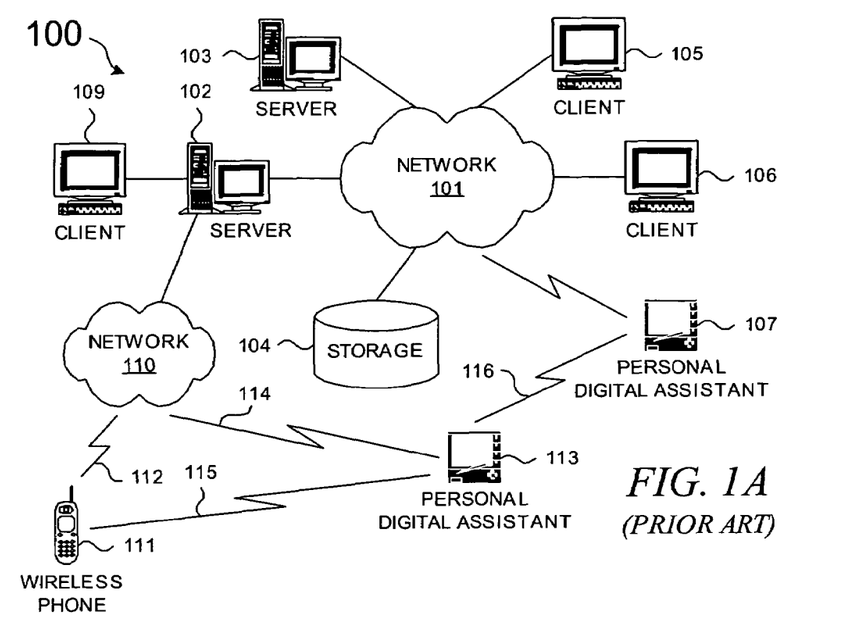
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
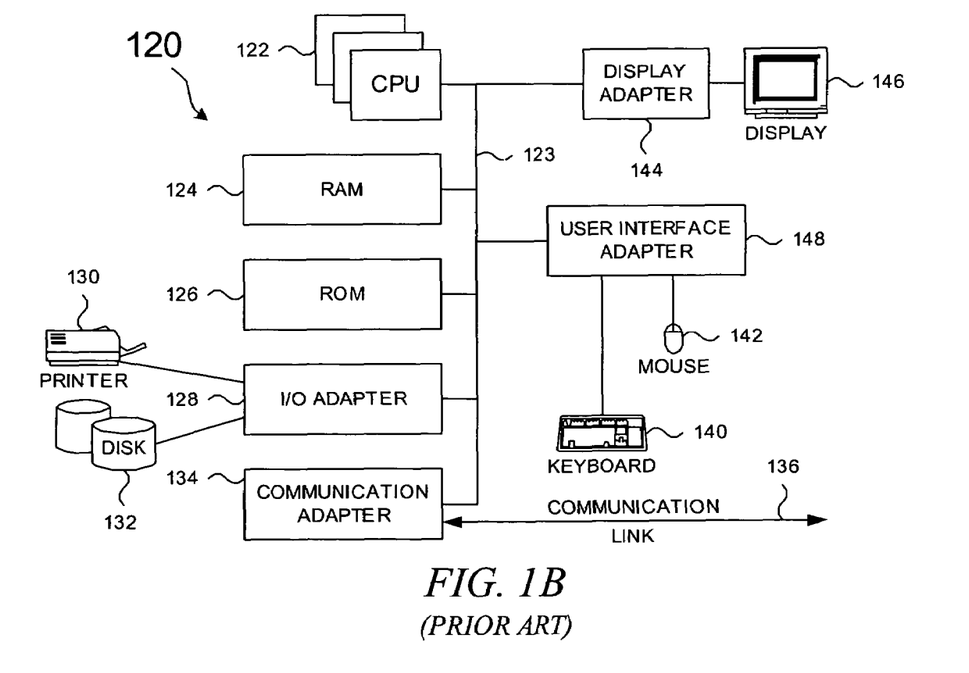
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The descriptions of the figures herein involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

The present invention may be implemented on a variety of hardware and software platforms, as described above with respect to FIG. 1A and FIG. 1B. More specifically, though, the present invention is directed to an improved system for processing digital certificates. Before describing the present invention in more detail, though, some background information about digital certificates is provided for evaluating the operational efficiencies and other advantages of the present invention.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical asymmetric cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key of the intended recipient to encrypt data, and the receiver uses its private key to decrypt the encrypted message.

When authenticating data, data can be signed by computing a digital signature from the data using the private key of the signer. Once the data is digitally signed, it can be stored with the identity of the signer and the signature that proves that the data originated from the signer. A signer uses its private key to sign data, and a receiver uses the public key of the signer to verify the signature.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction, that is trusted to sign or issue certificates for other people or entities. The CA usually has some kind of legal responsibilities for its vouching of the binding between a public key and its owner that allow one to trust the entity that signed a certificate. There are many commercial certificate authorities; these authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a commercial company that provides trusted third-party certificate authority services. The certificate authority will then generate the certificate and return it. The certificate may contain other information, such as a serial number and dates during which the certificate is valid. One part of the value provided by a certificate authority is to serve as a neutral and trusted introduction service, based in part on their verification requirements, which are openly published in their Certification Service Practices (CSP).

A CA creates a new digital certificate by embedding the requesting entity's public key along with other identifying information and then signing the digital certificate with the CA's private key. Anyone who receives the digital certificate during a transaction or communication can then use the public key of the CA to verify the signed public key within the certificate. The intention is that the CA's signature acts as a tamper-proof seal on the digital certificate, thereby assuring the integrity of the data in the certificate.

Other aspects of certificate processing are also standardized. The Certificate Request Message Format (RFC 2511) specifies a format that has been recommended for use whenever a relying party is requesting a certificate from a CA. Certificate Management Protocols have also been promulgated for transferring certificates.

Figure 2:
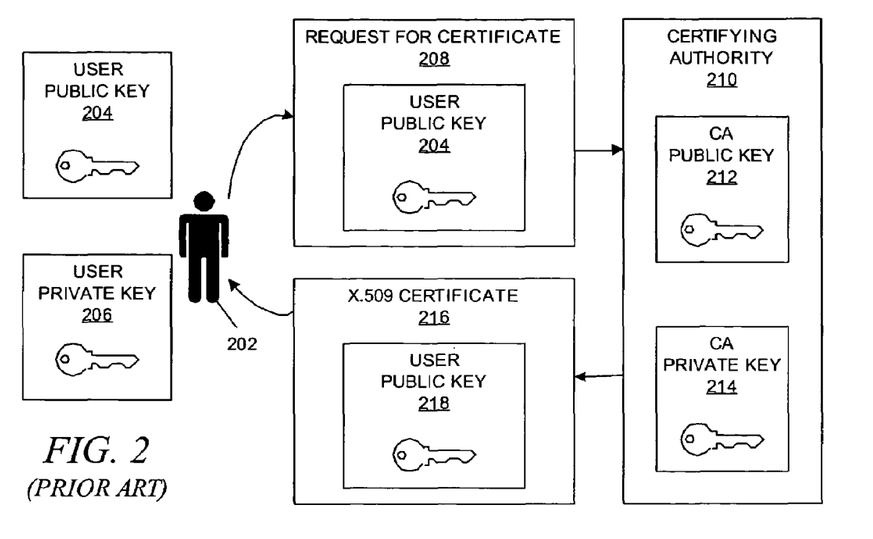
FIG. 2 depicts a block diagram that shows a typical manner in which an individual obtains a digital certificate.
Figure 3:
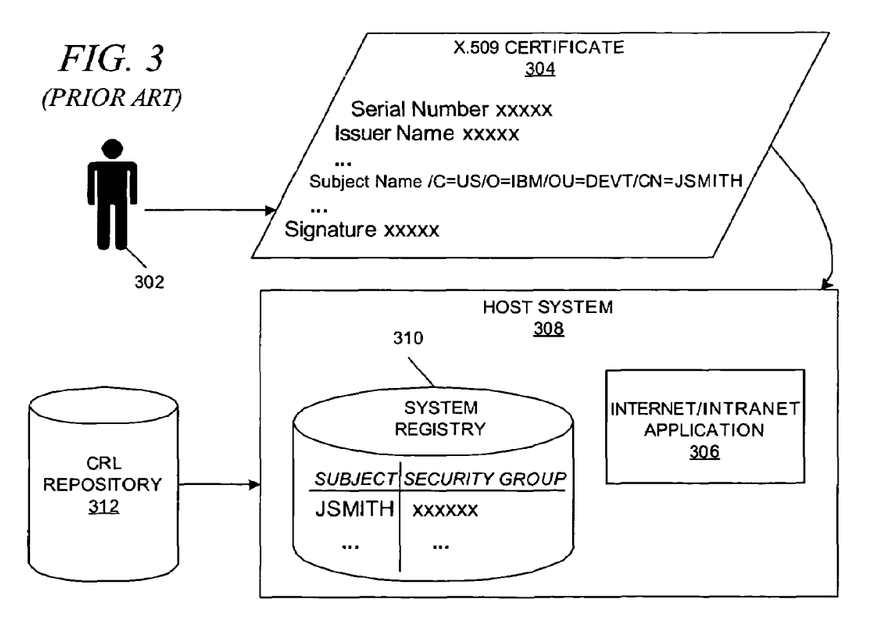
FIG. 3 depicts a block diagram that shows a typical manner in which an entity may use a digital certificate to be authenticated to a data processing system.

The present invention resides in a distributed data processing system that employs digital certificates; the description of FIGS. 2-3 provides background information about typical operations involving digital certificates.

With reference now to FIG. 2, a block diagram depicts a typical manner in which an individual obtains a digital certificate. User 202, operating on some type of client computer, has previously obtained or generated a public/private key pair, e.g., user public key 204 and user private key 206. User 202 generates a request for certificate 208 containing user public key 204 and sends the request to certifying authority 210, which is in possession of CA public key 212 and CA private key 214. Certifying authority 210 verifies the identity of user 202 in some manner and generates X.509 digital certificate 216 containing user public key 218. The entire certificate is signed with CA private key 214; the certificate includes the public key of the user, the name associated with the user, and other attributes. User 202 receives newly generated digital certificate 216, and user 202 may then present digital certificate 216 as necessary to engage in trusted transactions or trusted communications. An entity that receives digital certificate 216 from user 202 may verify the signature of the CA by using CA public key 212, which is published and available to the verifying entity.

With reference now to FIG. 3, a block diagram depicts a typical manner in which an entity may use a digital certificate to be authenticated to a data processing system. User 302 possesses X.509 digital certificate 304, which is transmitted to an Internet or intranet application 306 on host system 308; application 306 comprises X.509 functionality for processing and using digital certificates. User 302 signs or encrypts data that it sends to application 306 with its private key.

The entity that receives certificate 304 may be an application, a system, a subsystem, etc. Certificate 304 contains a subject name or subject identifier that identifies user 302 to application 306, which may perform some type of service for user 302. The entity that uses certificate 304 verifies the authenticity of the certificate before using the certificate with respect to the signed or encrypted data from user 302.

Host system 308 may also contain system registry 310 which is used to authorize user 302 for accessing services and resources within system 308, i.e. to reconcile a user's identity with user privileges. For example, a system administrator may have configured a user's identity to belong to certain a security group, and the user is restricted to being able to access only those resources that are configured to be available to the security group as a whole. Various well-known methods for imposing an authorization scheme may be employed within the system.

In order to properly validate or verify a digital certificate, an application must check whether the certificate has been revoked. When the certifying authority issues the certificate, the certifying authority generates a unique serial number by which the certificate is to be identified, and this serial number is stored within the "Serial Number" field within an X.509 certificate. Typically, a revoked X.509 certificate is identified within a CRL via the certificate's serial number; a revoked certificate's serial number appears within a list of serial numbers within the CRL.

In order to determine whether certificate 304 is still valid, application 306 obtains a certificate revocation list (CRL) from CRL repository 312 and validates the CRL. Application 306 compares the serial number within certificate 304 with the list of serial numbers within the retrieved CRL, and if there are no matching serial numbers, then application 306 validates certificate 304. If the CRL has a matching serial number, then certificate 304 should be rejected, and application 306 can take appropriate measures to reject the user's request for access to any controlled resources.

Given the background information about digital certificates, the description now turns to the present invention, which is directed to an improved system for processing digital certificates. As mentioned above, in order to interact with many other applications, applications now need the capability of building and validating certification paths in order to set up a PKI-compliant communication session or for completing a PKI-compliant transaction. However, validation of a certificate or a certificate chain requires signature verifications and certificate revocation status checks for each certificate or for each certificate within a certificate chain; validation can be a time-consuming task for a single certificate and which increases with certificate chains of longer length. In particular, XML digital signatures provide message level authentication and integrity, while HTTPS provides transport level authentication and integrity. The combination of both enables secure and trusted communications, but a new model is needed to process certificate validation requests from both levels. The present invention provides a method and system for offloading certificate validation processes into an online certificate validation service that is accessible and sharable by multiple components within a system. By centralizing the certificate operations, each component that needs such services would have a smaller footprint, and certain efficiency gains may be obtained, thereby increasing system performance, as explained in more detail hereinbelow with reference to the remaining figures.

Figure 4:
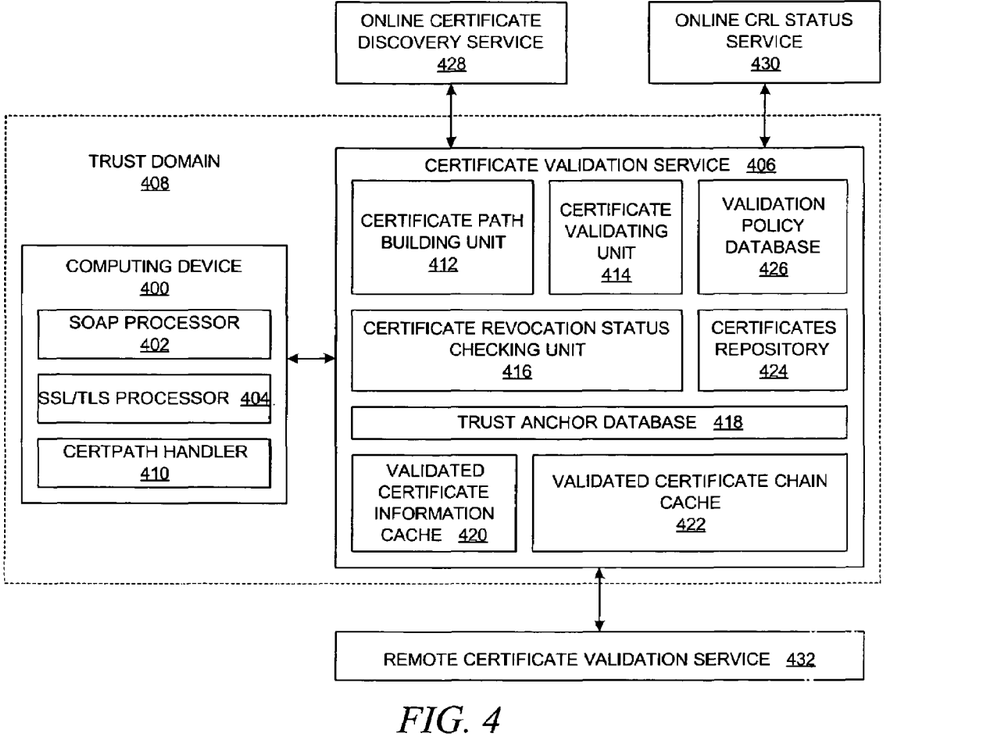
FIG. 4 depicts a block diagram that shows some components in an example of an implementation of a certificate validation service.

With reference now to FIG. 4, a block diagram depicts some components in an example of an implementation of a certificate validation service in accordance with the present invention. Computing device 400 is similar to the devices that are shown in FIG. 1A; computing device 400 supports various types of applications, operating system components, runtime environments, software units, devices, or other types of computational entities that may require the validation of a certificate during the course of performing some type of computational task. In the example that is shown in FIG. 4, SOAP (Simple Object Access Protocol) processor 402 and SSL/TLS (Secure Sockets Layer/Transport Layer Security) processor 404 are explicitly shown as these types of software entities need to validate significant numbers of digital certificates in order to perform other tasks securely, although computing device 400 may have a different set of components with similar requirements.

Rather than embedding or bundling certificate validation logic in each of the components that need it, the present invention provides a solution in which the certificate validation logic is offloaded into certificate validation service 406; certificate validation service 406 may be implemented such that it is located anywhere within a distributed data processing environment, including computing device 400, although more likely to be implemented within a server-class device. Computing device 400 or its supported components can be assumed to have formed some type of trust relationship with certificate validation service 406 such that computing device 400 can securely send certificate validation request messages to certificate validation service 406; the certificate validation request and response messages between certificate validation service 406 and other entities may be implemented as security tokens as necessary. For example, computing device 400 and certificate validation service 406 may reside in the same trust domain or security domain 408, or they may communicate over secure communication paths or reside behind the same firewall. Alternatively, components that invoke certificate validation service 406 may execute on the same physical device as certificate validation service 406, e.g., on the same server or on the same trusted computing platform. Components that invoke certificate validation service 406 may do so directly through remote procedure calls, remote method invocations, transmittal of messages to configurable destination addresses, or some other technique.

Alternatively, components that invoke certificate validation service 406 may do so indirectly through a certificate path handler component 410 that executes on the same physical device or within the same runtime environment.

In an exemplary embodiment, the present invention may be implemented to support various types of services within a web services framework. For example, computing device 400 may receive an XML document as part of a request to initiate a transaction using the SOAP protocol. The XML document may be accompanied by a digital certificate for the user/client that is requesting the transaction, e.g., such that the user/client can positively assert its identity; alternatively, the XML document may have an embedded URI that references a digital certificate for the user/client that is requesting the transaction such that an entity may retrieve the digital certificate, e.g., from a publicly accessible certificate repository. In any case, the SOAP processor is able to invoke functionality at the certificate validation service to perform any certificate validation processes on the digital certificate or the reference to the digital certificate. The SOAP processor may transfer its request to the certificate validation service within an XML-formatted message; the content of the messages that are used by the certificate validation service may vary with different implementations.

Certificate validation service 406 may be organized such that various certificate processing tasks are logically separated, e.g., certificate path building unit 412, certificate validating unit 414, and certificate revocation status checking unit 416. Certificate revocation status checking unit 416 may have subscription with CRL publishing services to receive CRL update notifications such that certificate revocation status checking unit 416 does not need to retrieve CRL's. Trust anchor database 418 stores copies of public key certificates of certificate authorities or other information about certificate authorities or other types of roots of trust or trust anchors, thereby allowing configuration of different trust anchors by the operator or system administrator of certificate validation service 406.

Validated certificate information cache 420 records information about end entity certificates that were successfully validated, i.e. those certificates that were presented to certificate validation service 406 for validation and then subsequently successfully validated. For example, each entry in the validated certificate information cache 420 may include a validated certificate's issuer name, subject name, serial number, expiration date, URI (Uniform Resource Identifier) for locating a published copy of the certificate, URI for locating its CRL, or other related information, thereby allowing a quick local lookup of the certificate along with frequently used information about the certificate. Validated certificate chain cache 422 records chaining information; for each certificate chain that is validated, chaining information from the first intermediate CA certificate in the certificate chain up to the trust anchor is stored in validated certificate chain cache 422. Certificates repository 424 caches the actual CA certificates that have been previously retrieved or validated such that local copies of CA certificates may be reused instead of fetching the certificates from a remote repository.

Validation policy database 426 provides policies that are to be employed by certificate validation service 406, thereby configuring its operation. For example, a policy may define:

the set of trust anchors to use for validation; the maximum certificate path length to be allowed during validation; enablement/disablement of a certificate revocation check; and any other limitations or characteristics to be applied during validation processing. Policies may be configured through a policy manager that is operated by a system administrator.

Although all of the validation tasks may be embedded within the certificate validation service 406, alternative embodiments may have the certificate validation service rely on other services to perform some aspects of its validation tasks. For example, online certificate discovery service 428 retrieves certificates from remote repositories; depending upon the request that it receives, the online certificate discovery service may return a response that contains a requested certificate or an entire chain of certificates. Online CRL status service 430 provides assistance with respect to certificate revocation lists, which may be performed in a variety of ways. For example, online CRL status service 430 may retrieve CRL's from remote CRL repositories that it may cache for retrieval by certificate validation service 406 or other certificate validation services. Online CRL status service 430 may maintain a subscription to the publication of certificate revocation lists with many certificate authorities, thereby receiving and caching copies of published CRL's. Alternatively, online CRL status service 430 may act as an OCSP responder in accordance with Myers et al., "X.509 Internet Public Key Infrastructure Online Certificate Status Protocol—OCSP", IETF RFC 2560, 06/1999, such that online CRL status service 430 provides the revocation status of a certificate when queried. Requests and responses between certificate validation service 406 and online certificate discovery service 428 and/or online CRL status service 430 may be formatted as XML documents. In addition, online certificate discovery service 428 and/or online CRL status service 430 may be implemented within a web services framework. In a preferred embodiment, communication between certificate validation service 406 and other web services may be implemented in accordance with the XML Key Management Specification (XKMS).

In an alternative embodiment, certificate validation service 406 may interact with other certificate validation services, such as remote certificate validation service 432. A unilateral or mutual certificate validation relationship between two certificate validation services might be created by operators of the certificate validation services in accordance with legal agreements, corporate rules, enterprise goals, or for some other reason. A plurality of certificate validation services may interoperate in a hierarchical fashion if desired or necessary. Such restrictions in which certificate validation services defer to other certificate validation services could be implemented through appropriate policies, which are triggered by particular information within a target certificate and/or a certificate validation request that has been received for validation. Assuming that certificate validation service 406 and remote certificate validation service 432 have some form of trust relationship, certificate validation service 406 may forward some of the certificate validation requests to remote certificate validation service 432 with the expectation that remote certificate validation service 432 performs certificate validation in a manner similar to certificate validation service 406. In addition, if certificate validation service 406 applies validation policies against its validation process, certificate validation service 406 may forward an applicable policy (or policies) to remote certificate validation service 432 along with a the certificate validation request to ensure that the same policy (or policies) were applied by remote certificate validation service 432 during its validation process. The certificate validation request and response messages between certificate validation service 406 and remote certificate validation service 432 may vary from the certificate validation request and response messages between a requesting computing device and certificate validation service 406.

Figure 5:
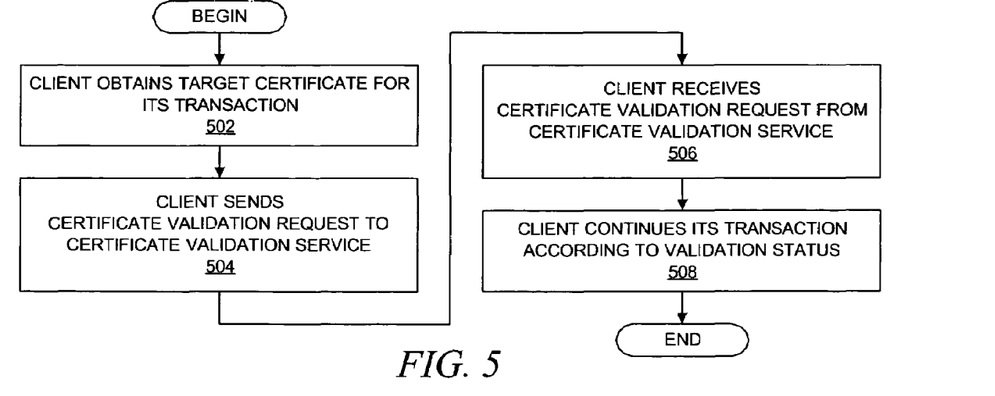
FIG. 5 depicts a flowchart that shows a process by which a client of a certificate validation service employs the service to perform certificate validation on its behalf.

With reference now to FIG. 5, a flowchart depicts a process by which a client of a certificate validation service employs the service to perform certificate validation on its behalf in accordance with an embodiment of the present invention. The process commences with a software component obtaining a digital certificate (step 502). For example, the digital certificate may be received at an e-commerce server from a remote party that is attempting to complete a transaction with the e-commerce server. In another case, a client may be attempting to construct a secure communication channel with a server through an exchange of digital certificates. In any case, the software component then sends a certificate validation request for a target certificate to a certificate validation service (step 504); with respect to the certificate validation service, the requesting software component may be described as a client of the certificate validation service, and the certificate validation service as a server that performs certificate validation tasks on behalf of a client. At a later point in time, the client receives a certificate validation response from the certificate validation service (step 506). The client then continues to process its transaction as appropriate in accordance with the certificate validation status that it receives from the certificate validation service (step 508), thereby concluding the process. In this manner, the client efficiently offloads its certification validation processing tasks to the certificate validation service.

Figure 6A:
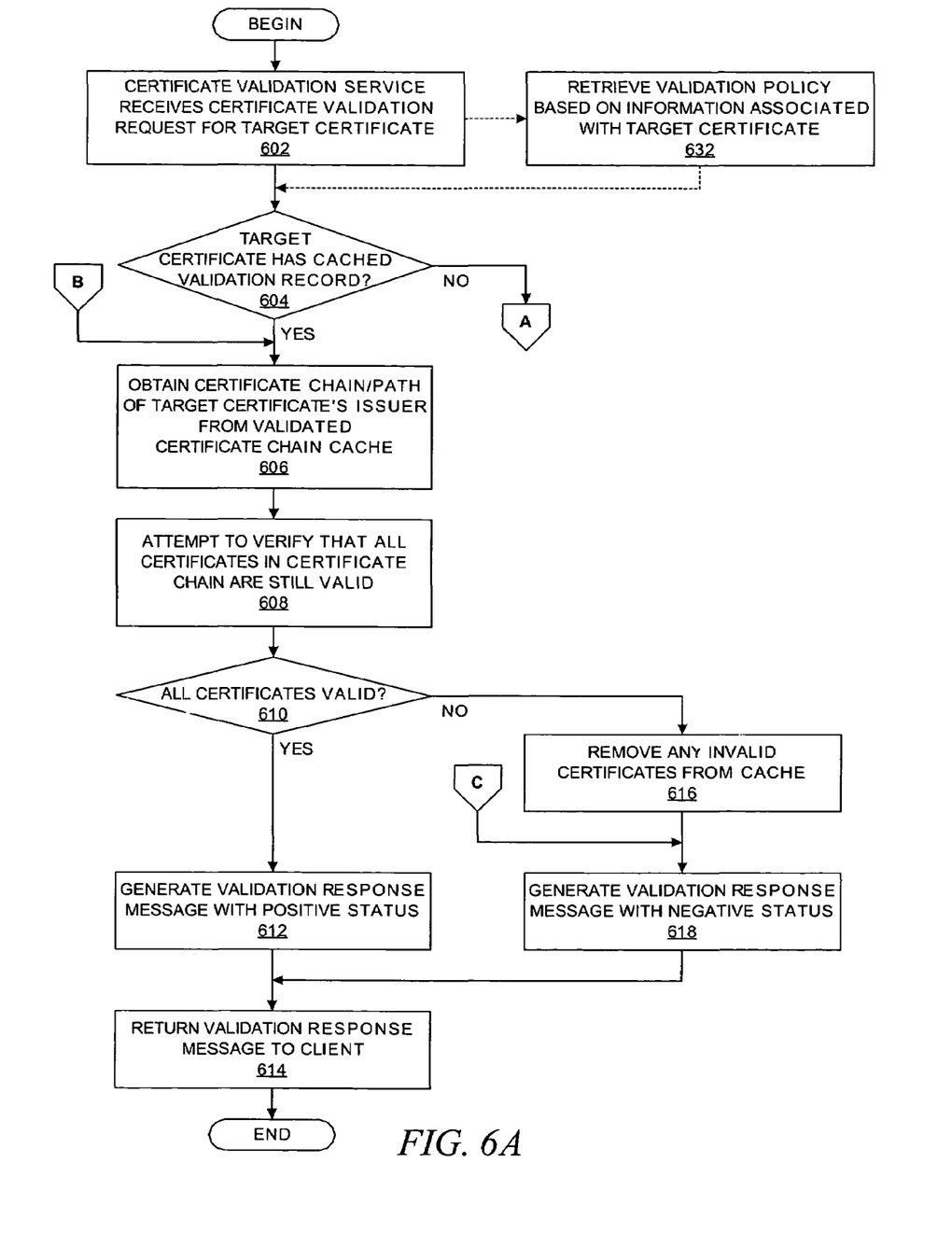
FIGS. 6A-6B depict flowcharts that show a process by which a certificate validation service performs certificate validation tasks.
Figure 6B:
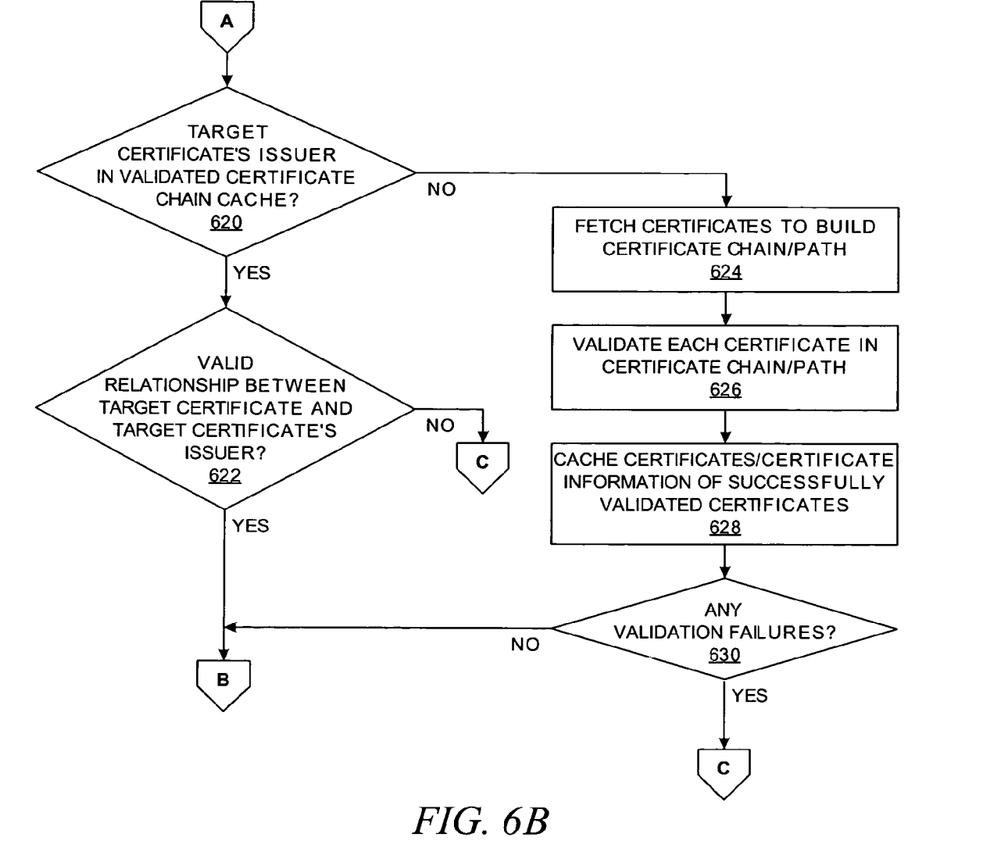

With reference now to FIGS. 6A-6B, a pair of flowcharts depict a process by which a certificate validation service perform certificate validation tasks in accordance with an embodiment of the present invention. The process commences when the certificate validation service receives a certificate validation request for a target certificate from a client (step 602). A determination is made as to whether the certificate validation service has previously cached a validation record for the target certificate after successfully validating the target certificate while processing a previous certificate validation request (step 604). If so, then the certificate validation service retrieves the appropriate cached certificate chain for the issuer of the target certificate (step 606).

The certificate validation service then optionally attempts to verify that all certificates in the certificate chain are still valid, e.g., by checking the expiration times and/or certificate revocation status of the individual certificates within the retrieved certificate chain (step 608). In an alternative embodiment, the certificate revocation status may be continually checked, e.g., by using background processes that receive publication of updated certificate revocation lists and then process those CRL's to update the cached information. Likewise, an alternative embodiment may include a process for continuously purging any information in the caches that relates to expired certificates. In these alternative embodiments, the information may be assumed to be current, thereby not requiring an optional validation of a retrieved certificate chain.

For example, referring again to FIG. 4, the certificate validation service looks up the target certificate within validated certificate information cache 420 using information from the target certificate and obtains a reference or link to the appropriate certificate chain in validated certificate chain cache 422, which would have been associated with or related to the previously cached information for the target certificate in validated certificate information cache 420 during the processing of a previous certificate validation request. Since certain certificate validation-related tasks have already been performed on the cached certificate chain information during the processing of a previous certificate validation request, e.g., the verification of digital signatures on the certificates, significant savings in processing time can be obtained with the use of the certificate validation service.

If all of the certificates in the retrieved certificate chain are determined to be valid (step 610), then the certificate validation service generates a validation response message with a positive status indication (step 612) and returns the validation response message to the client (step 614), thereby concluding the process; the indicating status value that shows that the target certificate is invalid may also be associated with a reason code. If any certificates within the target certificate's certificate chain are found to be invalid at step 610, then information about the invalid certificates would be removed from the appropriate caches or repositories (step 616). A validation response message with a negative status indication is generated (step 618) and returned to the requesting client at step 614, thereby concluding the process.

If it is determined at step 604 that the certificate validation service has not previously cached a validation record for the target certificate, then the certificate validation service determines if a record has been created in the validated certificate chain cache for the target certificate's issuer (step 620). In this case, the certificate validation service may not have cached information for the target certificate, but the certificate validation service may have cached information about the target certificate's issuer, e.g., because the validation service has previously processed a different target certificate that had the same certificate authority. If it is determined at step 620 that the certificate validation service has previously cached information about the target certificate's issuer, then a determination is made as to whether or not there is a valid and trusted relationship between the target certificate's issuer and the target certificate (step 622); in other words, the target certificate is checked for validity with respect to the cached information about the target certificate's purported issuer. If the target certificate is valid at step 622, then the process branches to step 606 to validate the remainder of the certificate chain. If the target certificate is not valid at step 622, then the certificate validation service generates a validation response message with a negative status indication at step 618 and returns the validation response message to the client at step 614, thereby concluding the process.

If it is determined at step 620 that the certificate validation service has not previously cached information about the target certificate's issuer, then the certificate validation service performs a typical certificate validation process in which the certificate validation service retrieves digital certificates as it attempts to build a certification path or certificate chain (step 624). Assuming that all of the necessary digital certificates are retrieved, e.g., from a local certificate repository, from remote certificate directories or repositories, or through an online certificate discovery service, then the certificate validation service validates each certificate in the certificate chain (step 626). In contrast to a typical certificate validation process, though, the certificate validation service caches CA certificates and chaining information in an appropriate cache or database (step 628). Referring again to FIG. 4, as the certificate validation service verifies certificates within a certificate chain, chaining information about certificates may be cached within validated certificate chain cache 422 while copies of the validated certificates are stored within certificate repository 424. Although a certificate may fail to be validated for a variety of reasons, e.g., a revoked certificate or an expired certificate, it is possible that a certificate chain would be validated from a root certificate up to, but not including, the invalid certificate, and this portion of the certificate chain could be cached, e.g., within validated certificate chain cache 422.

Alternatively, the certificate validation service may perform other steps in place of steps 624-628 by sending a request to validate the target certificate to a remote certificate validation service, such as remote certificate validation service 432, possibly along with a certificate validation policy. The remote certificate validation service would either return a positive response, which may contain an expected certificate chain, or a negative response. If a remote certificate validation service were employed, then the type of response that is received from the remote certificate validation service would be used to determine the outcome of the determination at step 630.

A determination is made as to whether or not steps 624-628 encountered any failures, such as any certificate validation failures (step 630). If so, then a validation response message with a negative status indication is generated at step 618 and returned to the requesting client at step 614, thereby concluding the process. If step 626 did not have any certificate validation failures, then the certificate validation service generates a validation response message with a positive status indication at step 612 and returns the validation response message to the client at step 614, thereby concluding the process.

In one embodiment of the present invention, a validation policy may be employed to configure the manner in which the certificate validation service performs its certification validation functionality; referring again to step 602, an embodiment of the present invention may include an optional step of retrieving a certificate validation policy based on information that is associated with the target certificate (step 632). As noted above, the certificate validation service may perform certain steps in different ways; by employing a certificate validation policy, a system administrator has the ability to configure the certificate validation service to select the manner in which those steps are performed. For example, a previously validated certificate, i.e. a certificate that was previously presented to the certificate validation service and subsequently validated, may be verified during subsequent certificate validation requests by checking the expiration date of the certificate along with other steps; the certificate validation policy may be used to determine what other processing steps should be applied against certain certificates.

Moreover, the certificate validation service may select a certificate validation policy to be applied against a target certificate based on information that is contained within the target certificate and/or based on information that is received in the certificate validation request message that is separate from the target certificate. For example, the certificate validation policy might be selected based on the domain of the end user that is associated with an incoming certificate validation request; in addition or alternatively, the certificate validation policy might be selected based on the issuer of the target certificate.

The advantages of the present invention should be apparent in view of the detailed description that is provided above. The present invention provides a method and system for offloading certificate validation processes into an online certificate validation service that is accessible and sharable by multiple components within a system. In so doing, the present invention achieves several advantages, particularly with respect to efficiency. Certification path processing entails building and validating a chain of trust between trusted certificate and a target certificate of an end-user or an end-entity. Depending on the depth of the path, the process may be complex and time consuming. Having an efficient path processing model can help improve overall system performance.

The present invention achieves several advantages, particular with respect to web services in that the present invention provides a new model for performing certificate validation to establish trusted web services communications and transactions. Current authentication solutions focus largely on human-machine interactions, particularly conventional HTML that is processed by a browser. In web services, the most likely uses of SOAP will be various types of specialized applications and not browsers. Hence, the growth of machine-to-machine interactions requires new mechanisms for web services to establish trust with each other, to which the present invention may be one solution.

As another advantage, most web browsers are shipped with an embedded list of trusted CA certificates. Generally, users of the browsers have little knowledge of the embedded policies using those certificates as trust anchors to verify a given certificate. More importantly, though, experienced users can modify the certificates and possibly change the manner in which they are used, thereby creating an "islands of security" model that is not suitable for enterprises that want to apply uniform security policies for the overall organization. The present invention provides a centrally administered process to apply certificate validation policy.

In addition, the XML digital signature specifications do not mandate that the signer must include its certificate in the document; instead, a link may be provided to a location where the "<ds:KeyInfo>" information may be found. Hence, a conventional certification path processing routine may not be able to recognize the format or may lack information to validate the remote party identity. With the present invention, the centralized certification validation processes can be updated more easily to accommodate changes in certificate standards and specifications.

It is important to note that while the present invention has been described in the context of a fully functioning data processing system, those of ordinary skill in the art will appreciate that the processes of the present invention are capable of being distributed in the form of instructions in a computer readable. Examples of computer readable media include media such as EPROM, ROM, tape, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for validating digital certificates by computational entities in a data processing system, the method comprising:

receiving from a first entity at a second entity a certificate validation request for a target certificate;

in response to a determination at the second entity that the target certificate is valid, sending a certificate validation response with an indicating status value that the target certificate is valid;

in response to a determination at the second entity that the target certificate is invalid, sending from the second entity to the first entity a certificate validation response with an indicating status value that the target certificate is invalid;

forwarding the certificate validation request to a third entity such that the third entity validates the target certificate;

forwarding to the third entity a certificate validation policy to be applied against the certificate validation request by the third entity, wherein the certificate validation policy configures processing of the target certificate;

caching information about a certificate and its certificate chain if the certificate is validated;

selecting a certificate validation policy to be applied against the certificate validation request based on information associated with the target certificate, wherein the certificate validation policy configures processing of the target certificate;

processing the certificate validation request at the second entity, wherein the certificate validation request contains a digital certificate and a Uniform Resource Identifier (URI) that references the digital certificate;

fetching the digital certificate that is referenced by the URI in the certificate validation request;

receiving information from an online certificate revocation list (CRL) status service at the second entity;

deleting cached information at the second entity in accordance with the information that has been received from the online CRL status service;

operating the second entity such that the second entity interacts with external entities within a web services architecture in accordance with the XML Key Management Specification (XKMS);

relying by the second entity on an online certificate discovery service for retrieval of digital certificates;

in response to receiving the certificate validation request for the target certificate, determining whether the second entity has previously cached information for the target certificate in response to a validation of the target certificate for a previously received certificate validation request;

in response to a determination that the second entity has previously cached information for the target certificate in response to a validation of the target certificate for a previously received certificate validation request, determining that the target certificate is valid by checking that all certificates in a cached certificate chain for the target certificate have not expired;

in response to a determination that the second entity has previously cached information for the target certificate in response to a validation of the target certificate for a previously received certificate validation request, determining that the target certificate is valid by checking that all certificates in a cached certificate chain for the target certificate have not been revoked; and in response to a determination that the second entity has not previously cached information for the target certificate in response to a validation of the target certificate for a previously received certificate validation request, determining that the target certificate is valid by constructing a certificate chain for the target certificate and validating all certificates in the certificate chain for the target certificate.

* * * * *